(12) United States Patent
Davis, Jr. et al.

(10) Patent No.: US 6,238,157 B1
(45) Date of Patent: May 29, 2001

(54) ATTACHMENT CONNECTION FOR VEHICLE TRIM COMPONENT

(75) Inventors: Joseph J. Davis, Jr., Ortonville; Timothy F. O'Brien, White Lake, both of MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 09/532,228

(22) Filed: Mar. 22, 2000

(51) Int. Cl.$^7$ .............................. F16B 19/00; F16B 21/00
(52) U.S. Cl. ...................... 411/339; 411/508; 411/526; 411/902; 411/908; 24/324; 24/453
(58) Field of Search ........................... 411/338, 339, 411/508, 509, 510, 525, 526, 902, 907, 908; 24/129 D, 324, 453

(56) References Cited

U.S. PATENT DOCUMENTS

| | | |
|---|---|---|
| 2,347,863 * | 5/1944 | Woodward ........................ 411/526 |
| 2,790,222 * | 4/1957 | Creedon ............................. 24/324 |
| 3,938,587 * | 2/1976 | Vian .............................. 411/339 X |
| 4,499,636 | 2/1985 | Tanaka . |
| 4,861,208 | 8/1989 | Boundy . |
| 5,036,567 | 8/1991 | Clinch . |
| 5,301,396 | 4/1994 | Benoit . |
| 5,339,501 | 8/1994 | Gugle et al. . |
| 5,416,954 | 5/1995 | Sobin . |
| 5,423,858 | 6/1995 | Bolanos et al. . |
| 5,704,573 | 1/1998 | de Beers et al. . |
| 5,846,631 | 12/1998 | Nowosiadly . |
| 5,907,891 | 6/1999 | Meyer . |
| 5,934,729 | 8/1999 | Baack . |
| 5,947,631 | 9/1999 | Hironaka et al. . |

FOREIGN PATENT DOCUMENTS

3194206 * 8/1991 (JP) ....................................... 411/339

* cited by examiner

Primary Examiner—Neill Wilson
(74) Attorney, Agent, or Firm—Brooks & Kushman P.C.

(57) ABSTRACT

An attachment connection (18) for securing a vehicle trim component (16) to a vehicle body sheet metal panel (20) includes an attachment projection (22) extending from the trim component with an attachment formation (24) molded in situ thereon from a softer material. An opening (26) in the sheet metal panel (20) includes a cantilevered leaf spring (28) having a terminal end (30) that is engaged with the softer attachment formation (24) upon insertion of the attachment projection into the opening to thereby provide securement of the trim component. The leaf spring (28) has a curved section (32) to provide enhanced spring action thereof and its terminal end (30) preferably has a curved shape that engages the attachment formation (24) on the attachment projection (22). An alternate embodiment has the attachment projection (22) provided with oppositely facing securement portions (42) and the sheet metal panel opening (26') has a pair of the cantilevered leaf springs (28) whose terminal ends (30) engage the softer material of the oppositely facing securement portions of the attachment formation on the attachment projection.

10 Claims, 2 Drawing Sheets

ATTACHMENT CONNECTION FOR VEHICLE TRIM COMPONENT

TECHNICAL FIELD

This invention relates to an attachment connection for securing a vehicle trim component to a vehicle body.

BACKGROUND ART

Vehicle trim components such as door panel liners, headliners, insignia plaques, etc. are conventionally secured to a vehicle sheet metal panel by separate fasteners which necessarily involve inventory costs as well as the cost involved with assembling the fasteners to the sheet metal panel and the trim component to the fastener.

Patents noted during an investigation conducted in connection with the present invention include U.S. Pat. No. 4,499,636 Tanaka; U.S. Pat. No. 4,861,208 Boundy; U.S. Pat. No. 5,036,567 Clinch; U.S. Pat. No. 5,301,396 Benoit; U.S. Pat. No. 5,339,501 Gugle et al.; U.S. Pat. No. 5,416,954 Sobin; U.S. Pat. No. 5,423,858 Bolanos et al.; U.S. Pat. No. 5,704,573 de Beers et al.; U.S. Pat. No. 5,846,631 Nowosiadly; U.S. Pat. No. 5,907,891 Meyer; U.S. Pat. No. 5,934,729 Baack; and U.S. Pat. No. 5,947,631 Hironaka et al.

DISCLOSURE OF INVENTION

An object of the present invention is to provide an improved attachment connection for securing a vehicle trim component to a vehicle body sheet metal panel.

In carrying out the above object, the attachment connection for securing the vehicle trim component to the vehicle body sheet metal panel includes an attachment projection extending from the trim component and an attachment formation molded in situ on the attachment projection from a softer material than the attachment projection. An opening formed in the sheet metal panel includes a cantilevered leaf spring having a terminal end that is engaged with the softer attachment formation of the attachment projection upon insertion of the attachment projection into the opening to thereby provide securement of the trim component.

In the preferred construction of the attachment connection, the leaf spring has a curved section to provide enhanced spring action thereof when its terminal end engages the attachment formation. The terminal end of the leaf spring also preferably has a curved shape that engages the attachment projection.

The preferred construction of the attachment connection has the opening of the vehicle body panel provided with clearance spacings on opposite sides of the leaf spring. These clearance spacings preferably have enlarged portions adjacent the terminal end of the leaf spring where the attachment projection is inserted.

In another embodiment of the vehicle trim component attachment connection, the attachment formation on the attachment projection includes oppositely facing securement portions, and the opening in the sheet metal panel has a pair of the cantilevered leaf springs having terminal ends that respectively engage the opposite facing securement portions of the attachment formation on the attachment projection to provide the securement of the trim component. The pair of leaf springs of this embodiment each has a curved section to provide enhanced spring action thereof when their terminal ends engage the oppositely facing securement portions of the attachment formation on the attachment projection. The terminal ends of both leaf springs have curved shapes that engage the oppositely facing securement portions of the attachment formation of the attachment projection.

The objects, features and advantages of the present invention are readily apparent from the following detailed description of the best mode for carrying out the invention when taken in connection with the accompanying drawings.

BEST MODE FOR CARRYING OUT THE INVENTION

Figure 1:
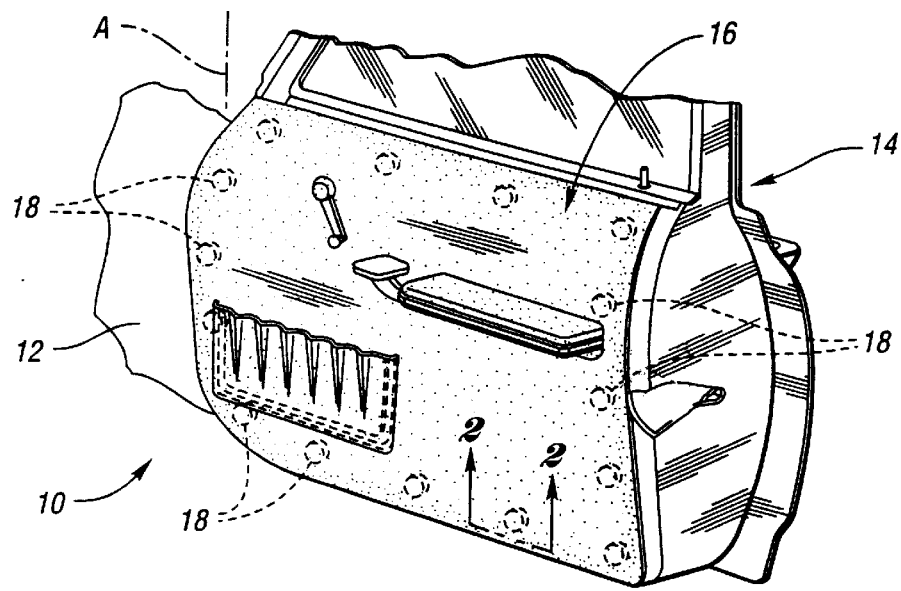
FIG. 1 is a partial view illustrating a vehicle whose door has an interior trim panel that is secured to a sheet metal panel of the door by attachment connections according to the present invention.

With reference to FIG. 1 of the drawings, a partially indicated vehicle identified generally by 10 includes a vehicle body 12 on which a door 14 is mounted by unshown hinges for movement about an axis A between open and closed positions in a conventional manner. The door 14 includes an inner trim panel 16 that is mounted by a plurality of attachment connections 18 that are constructed in accordance with the invention and illustrated by hidden line representation.

Figure 2:
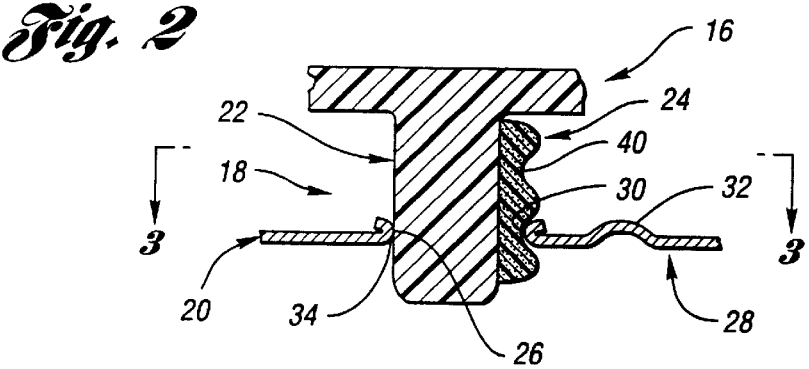
FIG. 2 is a sectional view taken along the direction of a line 2—2 in FIG. 1 to illustrate the construction of the attachment connections.
Figure 3:
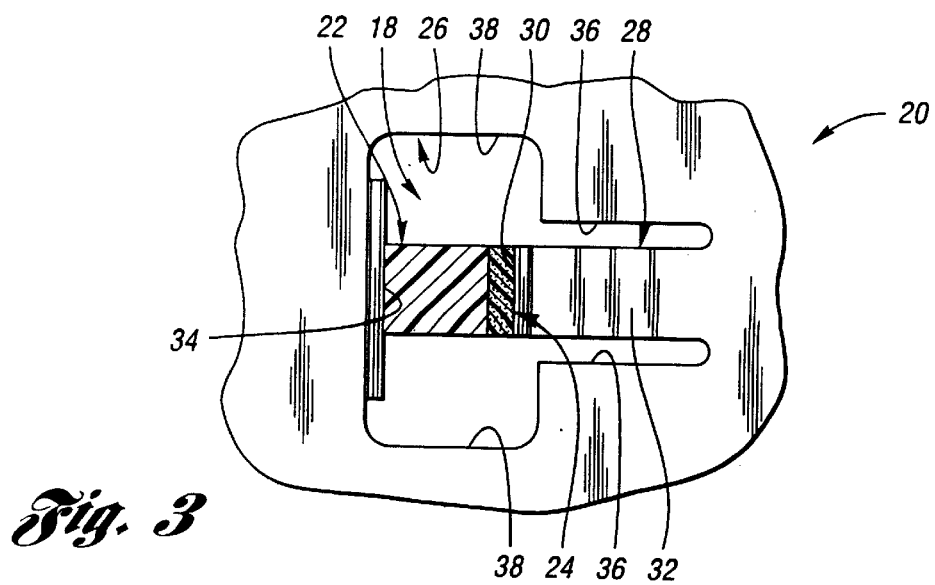
FIG. 3 is a sectional view taken along the direction of line 3—3 in FIG. 2 to further illustrate the construction of the attachment connection.

With further reference to FIGS. 2 and 3, the trim panel 16 is mounted on an inner sheet metal panel 20 of the vehicle door by the attachment connection 18 illustrated. More specifically, the attachment connection includes an attachment projection 22 that extends from the trim panel 16 in an integral manner as illustrated. More specifically, the trim panel 16 as shown is molded from plastic and the attachment projection 22 of each connection is molded integrally with the trim panel. An attachment formation 24 is molded in situ on the attachment projection 22 from a softer material than the attachment projection. For example, the trim panel 16 and its attachment projection 22 may be molded from a suitable resin plastic while the attachment formation 24 is molded from a softer material such as a foamed plastic.

With continuing reference to FIGS. 2 and 3, each attachment connection 18 has an opening 26 formed in the sheet metal panel 20 and including a cantilevered leaf spring 28 having a terminal end 30 that is engaged with the softer attachment formation 24 of the attachment projection 22 upon insertion of the attachment projection into the opening to thereby provide securement of the trim panel. The cantilevered leaf spring 24 has a curved section 32 to provide enhanced spring action thereof when its terminal end 30 engages the attachment formation 24 upon insertion of the attachment projection into the opening 26. This terminal end 30 of the leaf spring 28 preferably has a curved shape shown in FIG. 2 for engaging the attachment projection upon the insertion of the attachment projection 22 into the sheet metal opening 26. Furthermore, the opening 26 has a curved edge 34 that engages the attachment projection 22 on the opposite side thereof as the attachment formation 24. In addition, the opening 26 in the sheet metal panel 20 also has clearance spacings 36 on opposite sides of the leaf spring 28 and these clearance spacings have enlarged portions 38 adjacent the terminal ends 30 of the leaf spring so as to insure that there is sufficient room for the attachment projection to be inserted.

The manner in which the attachment formation 24 is molded in situ on the attachment projection 22 from a softer material in cooperation with the spring action provided by the cantilevered leaf spring 28 of the sheet metal panel 20 provides a reliable but yet effective attachment upon insertion of the attachment projection into the sheet metal opening 26 as described above.

It will be noted that the attachment projection 24 has a plurality of attachment grooves 40 so that the insertion and attachment can be to different extents depending upon tolerances and clearances as necessary.

Figure 4:
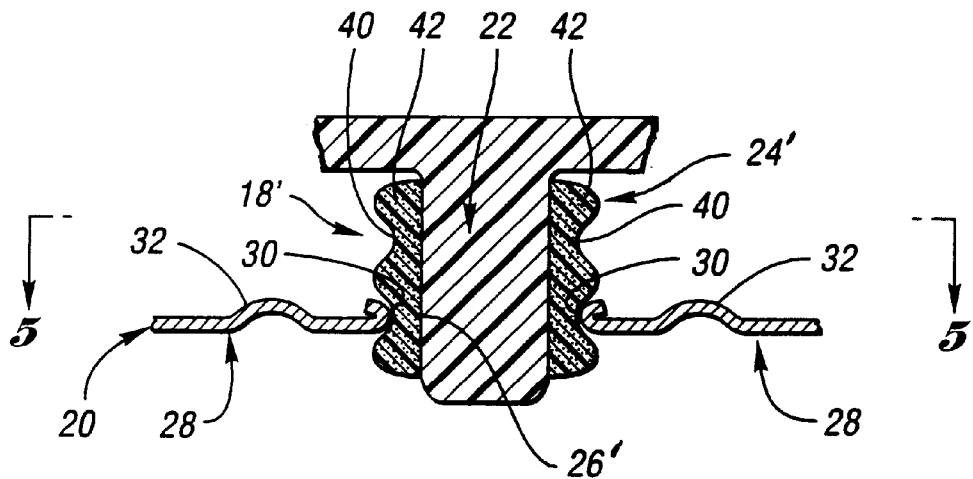
FIG. 4 is a sectional view similar to FIG. 2 but illustrating another embodiment of the attachment connection.
Figure 5:
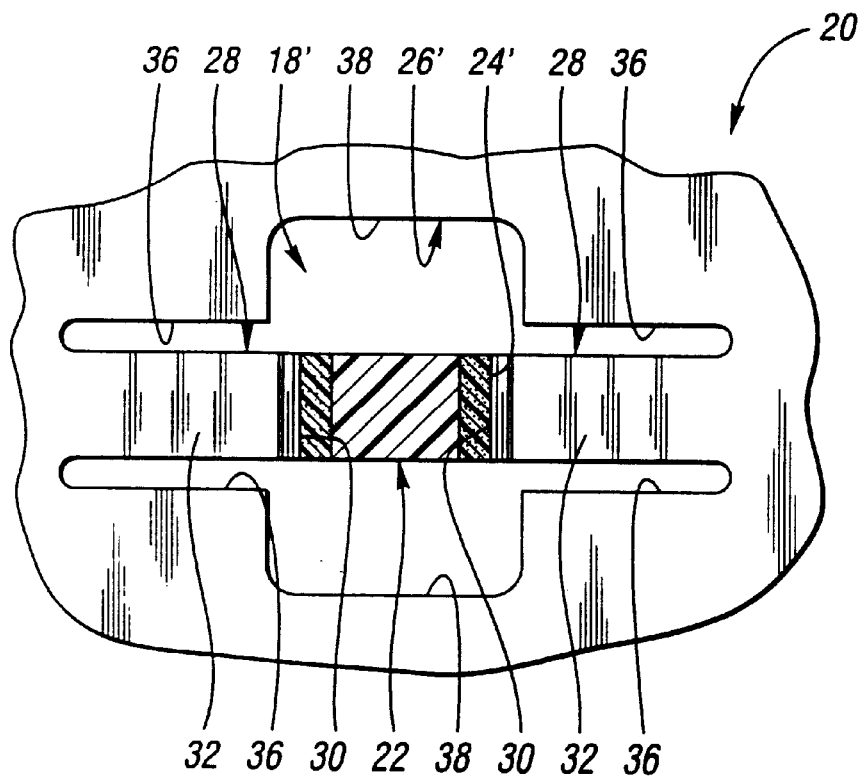
FIG. 5 is a sectional view taken along the direction of line 5—5 in FIG. 4 to further illustrate the construction of the alternate embodiment of the attachment connection.

With reference to FIGS. 4 and 5, an alternate embodiment of the attachment connection 18' has the attachment formation 24' on the attachment projection 22 constructed to include oppositely facing securement portions 42 on the attachment projection 26. Furthermore, the opening 26' of the sheet metal panel 20 has a pair of the cantilevered leaf springs 28 whose terminal ends 32 respectively engage the oppositely facing securement portions 42 of the attachment formation 24' on the attachment projection 22 to provide the securement of the trim panel 16. Each of these leaf springs 28 has a curved section 32 in order to provide enhanced spring action thereof when their terminal ends 30 engage the oppositely facing securement portions 42 of the attachment formation 24' on the attachment projection 22. Furthermore, the terminal ends 30 of both leaf springs 28 have curved shapes as shown in FIG. 4 for engaging the oppositely facing securement portions 42 of the attachment formation 24' on the attachment projection 22.

As shown in FIG. 5, the opening 26' in the sheet metal panel 20 has the clearance spacings 36 on opposite sides of both of the leaf springs 28 and has the enlarged portions 38 adjacent the terminal ends 30 of the leaf springs in order to ensure sufficient spacing for insertion of the attachment projection 22 even with the tolerance buildup that can result from the numerous attachment connections utilized with a large trim component such as the door trim panel shown in FIG. 1.

While the best mode for carrying out the invention has been described in detail, those familiar with the art to which this invention relates will recognize various alternative designs and embodiments for practicing the invention as defined by the following claims.

What is claimed is:

1. An attachment connection for securing a vehicle trim component to a vehicle body sheet metal panel, the attachment connection comprising:
    an attachment projection extending from the trim component;
    an attachment formation molded in situ on the attachment projection from a softer material than the attachment projection; and
    an opening formed in the sheet metal panel and including a cantilevered leaf spring having a terminal end that is engaged with the softer attachment formation of the attachment projection upon insertion of the attachment projection into the opening to thereby provide securement of the trim component.

2. A vehicle trim component attachment connection as in claim 1 wherein the leaf spring has a curved section to provide enhanced spring action thereof when its terminal end engages the attachment formation.

3. A vehicle trim component attachment connection as in claim 1 wherein the terminal end of the leaf spring has a curved shape that engages the attachment projection.

4. A vehicle trim component attachment connection as in claim 1 wherein the opening of the vehicle body panel has clearance spacings on opposite sides of the leaf spring.

5. A vehicle trim component attachment connection as in claim 4 wherein the clearance spacings have enlarged portions adjacent the terminal end of the leaf spring.

6. A vehicle trim component attachment connection as in claim 1 wherein the attachment formation on the attachment projection includes oppositely facing securement portions, and the opening in the sheet metal panel has a pair the cantilevered leaf springs having terminal ends that respectively engage the oppositely facing securement portions of the attachment formation on the attachment projection to provide the securement of the trim component.

7. A vehicle trim component attachment connection as in claim 6 wherein the pair of leaf springs each has a curved section to provide enhanced spring action thereof when their terminal ends engage the oppositely facing securement portions of the attachment formation of the attachment projection.

8. A vehicle trim component attachment connection as in claim 7 wherein the terminal ends of both leaf springs have curved shapes that engage the oppositely facing securement portions of the attachment formation of the attachment projection.

9. An attachment connection for securing a vehicle trim component to a vehicle body sheet metal panel, the attachment connection comprising:
    an attachment projection extending from the trim component;
    an attachment formation molded in situ on the attachment projection from a softer material than the attachment projection; and
    an opening formed in the sheet metal panel and including a cantilevered leaf spring having a terminal end of a curved shape that engages the softer attachment formation of the attachment projection upon insertion of the attachment projection into the opening to provide securement of the trim component, and the leaf spring having a curved section to provide enhanced spring action thereof upon engaging the attachment formation.

10. An attachment connection for securing a vehicle trim component to a vehicle body sheet metal panel, the attachment connection comprising:
    an attachment projection extending from the trim component;
    an attachment formation having oppositely facing securement portions molded in situ on the attachment projection from a softer material than the attachment projection; and
    an opening formed in the sheet metal panel and including a pair of cantilevered leaf springs having terminal ends of curved shapes that respectively engage the oppositely facing securement portions of the softer attachment formation of the attachment projection upon insertion of the attachment projection into the opening to secure the trim component; and each of the pair of leaf springs having a curved section to provide enhanced spring action thereof upon engaging the attachment formation.

* * * * *